United States Patent
Zhang

(10) Patent No.: US 12,531,611 B2
(45) Date of Patent: *Jan. 20, 2026

(54) METHOD AND DEVICE FOR MULTI-ANTENNA TRANSMISSION IN UE AND BASE STATION

(71) Applicant: Apogee Networks, LLC, Dallas, TX (US)

(72) Inventor: Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,382

(22) Filed: May 10, 2023

(65) Prior Publication Data

US 2023/0275633 A1    Aug. 31, 2023

Related U.S. Application Data

(63) Continuation of application No. 17/860,039, filed on Jul. 7, 2022, now Pat. No. 11,695,460, which is a
(Continued)

(51) Int. Cl.
*H04K 1/10*      (2006.01)
*H04B 7/0456*    (2017.01)
(Continued)

(52) U.S. Cl.
CPC ......... *H04B 7/0617* (2013.01); *H04B 7/0456* (2013.01); *H04B 7/0686* (2013.01); *H04L 5/0053* (2013.01)

(58) Field of Classification Search
CPC .. H04B 7/0617; H04B 7/0456; H04B 7/0686; H04B 7/0691; H04L 5/0053
(Continued)

(56) References Cited

U.S. PATENT DOCUMENTS 10,638,484 B2 *  4/2020  Seo ................... H04L 25/0224
10,849,140 B2 * 11/2020  Xiong ............... H04W 72/1215
(Continued)

FOREIGN PATENT DOCUMENTS

CN     102137505 A     7/2011
CN     105227272 A     1/2016
(Continued)

OTHER PUBLICATIONS

ISR received in application No. PCT/CN2017/077175 dated Aug. 30, 2017.
(Continued)

*Primary Examiner* — Phuong Phu
(74) *Attorney, Agent, or Firm* — Volpe Koenig

(57) ABSTRACT

The disclosure provides a method and a device for multi-antenna transmission in a base station and a User Equipment (UE). The UE, in turn, receives a first higher-layer signaling, monitors a first-type physical layer signaling in a first radio resource pool, and receives second downlink information in a second radio resource pool. The first higher-layer signaling is used for determining first information and second information, and the first information is used for multi-antenna related receiving in the first radio resource pool. The first-type physical layer signaling is detected, and the first-type physical layer signaling is used for multi-antenna related receiving in the second radio resource pool, or, the first-type physical layer signaling is not detected, and the second information is used for multi-antenna related receiving in the second radio resource pool. The second radio resource pool is related to the first radio resource pool.

22 Claims, 10 Drawing Sheets

Related U.S. Application Data continuation of application No. 17/239,701, filed on Apr. 26, 2021, now Pat. No. 11,418,242, which is a continuation of application No. 16/554,635, filed on Aug. 29, 2019, now Pat. No. 11,025,320, which is a continuation of application No. PCT/CN2017/077175, filed on Mar. 18, 2017.

(51) Int. Cl.
  *H04B 7/06* (2006.01)
  *H04L 5/00* (2006.01)
  *H04L 27/28* (2006.01)

(58) Field of Classification Search
  USPC .................. 375/260, 295, 316, 219, 222
  See application file for complete search history.

(56) References Cited

U.S. PATENT DOCUMENTS

| | | | | |
|---|---|---|---|---|
| 11,025,320 | B2* | 6/2021 | Zhang | H04B 7/0691 |
| 11,233,557 | B2* | 1/2022 | Lee | H04L 5/0044 |
| 11,382,136 | B2* | 7/2022 | Deng | H04W 72/0446 |
| 11,418,242 | B2* | 8/2022 | Zhang | H04B 7/0691 |
| 11,695,460 | B2* | 7/2023 | Zhang | H04B 7/0617 |
| | | | | 375/262 |
| 2013/0094477 | A1 | 4/2013 | Liu | |
| 2015/0181406 | A1 | 6/2015 | Seo | |
| 2017/0034812 | A1 | 2/2017 | Deng | |

FOREIGN PATENT DOCUMENTS

| | | |
|---|---|---|
| CN | 105323034 A | 2/2016 |
| CN | 105530075 A | 4/2016 |
| CN | 106385710 A | 2/2017 |
| CN | 106470062 A | 3/2017 |
| WO | 2014161145 A1 | 10/2014 |
| WO | 2015149645 A1 | 10/2015 |
| WO | 2015197021 A1 | 12/2015 |

OTHER PUBLICATIONS

First Office Action received in application No. CN201780006630.1 dated Sep. 21, 2020.
First Search Report received in application No. CN201780006630.1 dated Sep. 14, 2020.
Second Office Action received in application No. CN201780006630.1 dated Mar. 11, 2021.
Third Office Action received in application No. CN201780006630.1 dated Jun. 23, 2021.
Notification to Grant Patent Right for Invention of Chinese patent application No. CN201780006630.1 dated Dec. 6, 2021.
Notification to Grant Patent Right for Invention of Chinese patent application No. CN202111569022.6 dated Nov. 4, 2022.
First Office Action of Chinese patent application No. CN202111569022.6 dated Jul. 20, 2022.
First Search Report of Chinese patent application No. CN202111569022.6 dated Jul. 12, 2022.
Broadcom Corporation Signaling and Coordination in NAICS 3GPP TSG-RAN WG1 Meeting #75 R1-135547 Nov. 15, 2013.
Third Generation Partnership Project, "Technical Specification Group Radio Access Network; Evolved Universal Terrestrial Radio Access (E-UTRA); Physical layer procedures (Release 14)," 3GPP TS 36.213 V14.1.0 (Dec. 2016).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.14.1 (Mar. 2013).

* cited by examiner

METHOD AND DEVICE FOR MULTI-ANTENNA TRANSMISSION IN UE AND BASE STATION

CROSS-REFERENCE TO RELATED APPLICATION

This application is a continuation of the U.S. patent application Ser. No. 17/860,039, filed on Jul. 7, 2022, which is a continuation of the U.S. patent application Ser. No. 17/239,701, file on Apr. 26, 2021, which is a continuation of the U.S. patent Ser. No. 16/554,635, filed Aug. 29, 2019, which is a continuation of International Application No. PCT/CN2017/077175, filed Mar. 18, 2017, the full disclosure of which is incorporated herein by reference.

BACKGROUND

Technical Field

The disclosure relates to transmission schemes for radio signals in wireless communication systems, and in particular to a method and a device for multi-antenna transmission.

Related Art

Massive Multi-Input Multi-Output (MIMO) becomes a research hotspot of next-generation mobile communications. In the massive MIMO, multiple antennas experience beamforming to form a relatively narrow beam which points to a particular direction to improve the quality of communication. One transmitting beam and one receiving beam form a beam pair. However, when signalings or data are or is transmitted using a pair of narrow beams, there will be a problem of low reliability in actual transmission due to blocking by a moving object or movement of User Equipment (UE). In order to improve the reliability of transmission of physical layer signalings, in discussions of 3GPP RAN-1 NR, some company proposes to use a plurality of beam pairs to transmit a Physical Downlink Control Channel (PDCCH) in different time resource pools. This approach to some extent may improve the reliability of the transmission of physical layer signalings using beam pairs.

SUMMARY

The inventor finds through research that the approach of using a plurality of beam pairs to transmit a PDCCH in different time resource pools will appear a problem of transmission performance degrading due to quality deterioration of one beam. If a Medium Access Control layer Control Element (MAC CE) is used for performing flexible configuration of beam pairs, there will be a problem of large signaling overheads. If a physical layer signaling is used for performing flexible configuration of beam pairs, there will be a problem of long-term damages to system performances due to false alarms. How to configure a plurality of beam pairs in a plurality of time resource pools dynamically and flexibly, so as to improve transmission capacity as far as possible while ensuring system robustness and to avoid serious degrading of transmission performances due to false alarms of physical layer signaling, is an urgent problem to be resolved in the approach of using a plurality of beam pairs to transmit physical layer signalings or data.

In view of the above problems, the disclosure provides a solution. It should be noted that the embodiments of the disclosure and the characteristics in the embodiments may be mutually combined arbitrarily if no conflict is incurred. For example, the embodiments of the base station of the disclosure and the characteristics in the embodiments may be applied to the UE, and vice versa.

The disclosure provides a method in a UE for multi-antenna transmission, wherein the method includes:
  receiving a first higher-layer signaling;
  monitoring a first-type physical layer signaling in a first radio resource pool; and
  receiving second downlink information in a second radio resource pool.

Herein, the first higher-layer signaling is used for determining first information and second information, and the first information is used for multi-antenna related receiving in the first radio resource pool. The first-type physical layer signaling is detected, and the first-type physical layer signaling is used for multi-antenna related receiving in the second radio resource pool; or, the first-type physical layer signaling is not detected, and the second information is used for multi-antenna related receiving in the second radio resource pool. The second radio resource pool is related to the first radio resource pool.

In one embodiment, the above method has a following benefit: the first-type physical layer signaling can be used for performing flexible configuration of multi-antenna related receiving in the second radio resource pool, thereby improving robustness and transmission capacity of the system.

In one embodiment, the monitoring refers that the UE performs a blind detection on a signal received in the first radio resource pool so as to determine whether the first physical layer signaling exists.

In one embodiment, the radio resource is one of or a combination of time domain resources, frequency domain resources or code domain resources.

In one embodiment, the first higher-layer signaling is a Radio Resource Control (RRC) configuration signaling.

In one embodiment, the first higher-layer signaling is an RRCReconfiguration signaling.

In one embodiment, the first higher-layer signaling includes one or more MAC CEs.

In one embodiment, the first higher-layer signaling includes one or more RRC IEs.

In one embodiment, the first higher-layer signaling is further used for determining the first radio resource pool and the second radio resource pool.

In one embodiment, the first higher-layer signaling is further used for determining the first radio resource pool, and the first-type physical layer signaling is further used for determining the second radio resource pool.

In one embodiment, the first radio resource pool and the second radio resource pool each are one control resource set.

In one embodiment, the first radio resource pool and the second radio resource pool each include multiple Resource Elements (REs).

In one embodiment, the first radio resource pool and the second radio resource pool each include multiple subframes.

In one embodiment, the first radio resource pool and the second radio resource pool each include multiple symbols.

In one embodiment, the symbol is an Orthogonal Frequency Division Multiplexing (OFDM) symbol.

In one embodiment, the symbol is a Discrete Frequency Transform Spread OFDM (DFT-s-OFDM) symbol.

In one embodiment, the first radio resource pool and the second radio resource pool each include control fields of multiple subframes.

In one embodiment, the control field refers to a symbol used for transmitting a PDCCH.

In one embodiment, the second radio resource pool and the first radio resource pool are orthogonal in time domain.

In one embodiment, the second radio resource pool corresponds to one subframe.

In one embodiment, the second radio resource pool corresponds to multiple consecutive subframes.

In one embodiment, the second radio resource pool corresponds to inconsecutive subframes which occur periodically.

In one embodiment, the second radio resource pool corresponds to inconsecutive subframes which occur periodically in a certain period of time.

In one embodiment, the UE monitors the control field in the first radio resource pool.

In one embodiment, the first-type physical layer signaling is a PDCCH.

In one embodiment, the first-type physical layer signaling is Downlink Control Information (DCI) used for determining DL scheduling assignment.

In one embodiment, the first-type physical layer signaling is a DCI used for determining UL scheduling grant.

In one embodiment, the second downlink information is a PDCCH.

In one embodiment, the second downlink information is a DCI used for determining DL scheduling assignment.

In one embodiment, the second downlink information is a DCI used for determining UL scheduling grant.

In one embodiment, the second downlink information includes a Physical Downlink Shared Channel (PDSCH).

In one embodiment, the second downlink information includes downlink transmitted data.

In one embodiment, the second downlink information includes an MAC CE.

In one embodiment, the first information and the second information are used for determining Quasi Co-located (QCLed) information of spatial correlation between a Demodulation Reference Signal (DMRS) port and a Channel State Information Reference Signal (CSI-RS) port.

In one embodiment, the spatial correlation refers to correlation of large-scale channel characteristics.

In one embodiment, the QCLed information is used for determining that the DMRS port uses the same transmitting analog beam as the CSI-RS QCLed with the DMRS port.

In one embodiment, the QCLed information is used for determining receiving beamforming.

In one embodiment, the QCLed information is used for determining a receiving analog beam.

In one embodiment, the first information and the second information are used for determining receiving beamforming used by the receiving in the first radio resource pool and the receiving in the second radio resource pool respectively.

In one embodiment, the first information and the second information are used for determining analog receiving beams used by the receiving in the first radio resource pool and the receiving in the second radio resource pool respectively.

In one embodiment, the first information and the second information are used for determining a multi-antenna transmission scheme.

In one embodiment, the multi-antenna transmission scheme is one of a Spatial Frequency Block Code (SFBC), a Spatial Time Block Code (STBC), precoder cycling, or transmit beamforming.

In one embodiment, the first-type physical layer signaling indicates implicitly the second radio resource pool.

In one embodiment, the first-type physical layer signaling is detected on a first radio resource, the second radio resource pool is located behind the first radio resource in time domain, and the first radio resource is used for calculating the second radio resource pool.

In one embodiment, the second radio resource pool is K consecutive subframe(s) starting from the Nth subframe behind the first radio resource, wherein the N and the K are positive integers.

In one embodiment, K first-type physical layer signalings are detected on K time domain resources respectively, and the second radio resource pool is located behind the K time domain resources in time domain. The first physical layer signaling is one of the K first-type physical layer signalings that is last transmitted in time domain. The first physical layer signaling is used for multi-antenna related receiving in the second radio resource pool. The K is a positive integer greater than 1.

Specifically, according to one aspect of the disclosure, the first information is used for determining at least one of a first antenna port group or a first vector group; and the second information is used for determining at least one of a second antenna port group or a second vector group. The first antenna port group and the second antenna port group each include a positive integer number of antenna port(s). The first vector group and the second vector group each include a positive integer number of vector(s).

In one embodiment, the above method has a following benefit: multi-beam transmission is configured through a higher-layer signaling to improve system robustness.

In one embodiment, the first information, in combination with other physical layer or Medium Access Control (MAC) layer information, is used for determining at least one of a first antenna port group or a first vector group.

In one embodiment, the second information, in combination with other physical layer or MAC layer information, is used for determining at least one of a first antenna port group or a first vector group.

In one embodiment, different Reference Signals (RSs) correspond to different antenna ports.

In one embodiment, the antenna port is formed by multiple physical antennas through antenna virtualization superposition. Mapping coefficients from the antenna port to the multiple physical antennas constitute beamforming vectors, which are applied to the antenna virtualization to form a beam.

In one embodiment, a first antenna port and a second antenna port are any two different antenna ports. A physical channel experienced by a signal corresponding to the first antenna port and a physical channel experienced by a signal corresponding to the second antenna port cannot be assumed to be the same.

In one embodiment, a physical channel experienced by a first signal corresponding to one first antenna port can be used to deduce a physical channel experienced by a second radio signal corresponding to the same antenna port, the first signal and the second signal are two signals transmitted on different radio resources.

In one embodiment, the first vector group is used for receiving beamforming in the first radio resource pool.

In one embodiment, the UE assumes that the first antenna port group is used for transmitting the first-type physical layer signaling.

In one embodiment, the UE assumes that an antenna port group used for transmitting the first-type physical layer signaling is QCLed with the first antenna port group.

In one embodiment, an antenna port group used for transmitting the first-type physical layer signaling is a DMRS antenna port group, and the first antenna port group is a CSI-RS antenna port group QCLed with the DMRS antenna port group.

In one embodiment, a receiving beam used for receiving the first antenna port group is used for receiving the first-type physical layer signaling.

In one embodiment, the UE employs the first vector group to perform receiving antenna virtualization in the first radio resource pool.

In one embodiment, the first-type physical layer signaling is not detected, the second antenna port group is used for determining receiving beamforming in the second radio resource pool.

In one embodiment, the first-type physical layer signaling is not detected, the second vector group is used for receiving beamforming in the second radio resource pool.

In one embodiment, the first-type physical layer signaling is detected, and the first-type physical layer signaling is used for determining receiving beamforming in the second radio resource pool, and the receiving beamforming in the second radio resource pool is unrelated to the second information.

In one embodiment, the first-type physical layer signaling is detected, the first-type physical layer signaling indicates that at least one of a first antenna port group or a first vector group is used for receiving beamforming in the second radio resource pool.

In one embodiment, the first-type physical layer signaling is not detected, the UE assumes that the second antenna port group is used for transmitting the second downlink information.

In one embodiment, the first-type physical layer signaling is not detected, the UE assumes that an antenna port group used for transmitting the second downlink information is QCLed with the second antenna port group.

In one embodiment, an antenna port group used for transmitting the second downlink information is a DMRS antenna port group, and the second antenna port group is a CSI-RS antenna port group QCLed with the DMRS antenna port group.

In one embodiment, the first-type physical layer signaling is not detected, and the UE employs the second vector group to perform receiving beam virtualization in the second radio resource pool.

In one embodiment, the first radio resource pool consists of K radio resource subpools, any two of the K radio resource subpools are orthogonal (that is, not overlapping) in time domain, the first antenna port group consists of K antenna port subsets, and the K antenna port subsets are used for determining receiving beamforming in the K radio resource subpools respectively. The K is a positive integer greater than 1.

In one embodiment, the first radio resource pool consists of K radio resource subpools, any two of the K radio resource subpools are orthogonal in time domain, the first vector group consists of K vector subsets, and the K vector subsets are used for receiving beamforming in the K radio resource subpools respectively. The K is a positive integer greater than 1.

In one embodiment, the first information is used for determining the K radio resource subpools.

In one embodiment, the first information is used for determining the K antenna port subsets.

In one embodiment, the first information is used for determining the K vector subsets.

Specifically, according to one aspect of the disclosure, the first-type physical layer signaling is used for determining at least one of a third antenna port group or a third vector group. The third antenna port group includes a positive integer number of antenna port(s). The third vector group includes a positive integer number of vector(s).

In one embodiment, the above method has a following benefit: the configuration of multi-beam transmission is changed flexibly and dynamically with small signaling overheads through the first-type physical layer signaling, which improves system performances.

In one embodiment, the first-type physical layer signaling is detected, and the UE assumes that the third antenna port group is used for transmitting the second downlink information.

In one embodiment, the first-type physical layer signaling is detected, and the UE assumes an antenna port group used for transmitting the second downlink information is QCLed with the third antenna port group.

In one embodiment, an antenna port group used for transmitting the second downlink information is a DMRS antenna port group, and the third antenna port group is a CSI-RS antenna port group QCLed with the DMRS antenna port group.

In one embodiment, the first-type physical layer signaling is detected, and the UE employs the third vector group to perform receiving antenna virtualization in the second radio resource pool.

In one embodiment, the first-type physical layer signaling is detected, and the third vector group is used for receiving beamforming in the second radio resource pool.

In one embodiment, the third vector group is the first vector group.

In one embodiment, the third vector group is one vector subgroup in the first vector group.

In one embodiment, the third antenna port group is the first antenna port group.

In one embodiment, the third antenna port group is one port subgroup in the first antenna port group.

Specifically, according to one aspect of the disclosure, the first higher-layer signaling is further used for determining the first radio resource pool and a second radio resource set, the first radio resource pool and the second radio resource set are orthogonal in time domain or frequency domain, and radio resources in the second radio resource pool are in the second radio resource set. The first-type physical layer signaling is not detected, the second information is used for multi-antenna related receiving in the second radio resource set; or, the first-type physical layer signaling is detected, the second information is used for multi-antenna related receiving in the second radio resource set other than the second radio resource pool.

In one embodiment, the above method has a following benefit: long-term negative impacts caused by false alarms of the first-type physical layer signaling are eliminated.

In one embodiment, the second radio resource set is used for determining the second radio resource pool.

In one embodiment, radio resources in the first radio resource pool occur periodically.

In one embodiment, radio resources in the second radio resource set occur periodically.

In one embodiment, the first-type physical layer signaling is used for determining the second radio resource pool.

In one embodiment, the second radio resource pool is N radio resource(s) consecutive in time domain. The N is a positive integer.

In one embodiment, the first-type physical layer signaling is used for determining a relative position of the second radio resource pool in the second radio resource set.

In one embodiment, the first-type physical layer signaling is detected on a first radio resource, and the second radio resource pool is the earliest N radio resource(s) in the second radio resource set behind the first radio resource, wherein the N is a positive integer.

In one embodiment, the first-type physical layer signaling is used for determining the N.

Specifically, according to one aspect of the disclosure, the second downlink information includes a second physical layer signaling. The second physical layer signaling lacks a first field compared with the first-type physical layer signaling, and the first field in the first-type physical layer signaling is used for multi-antenna related receiving in the second radio resource pool. The first-type physical layer signaling and the second physical layer signaling correspond to a same signaling format. The first field includes a positive integer number of information bit(s).

In one embodiment, the above method has a following benefit: through the restriction of the scope of the second radio resource pool, large-scope impacts brought to system performances by false alarms due to error detection are reduced.

In one embodiment, the signaling format is a DCI format.

In one embodiment, the signaling format includes a bit used for determining DL scheduling assignment.

In one embodiment, the signaling format includes a bit used for UL scheduling grant.

In one embodiment, candidate values for a number of REs occupied by one first-type physical layer signaling constitute a first integer set, and candidate values for a number of REs occupied by one second physical layer signaling constitute a second integer set. An average of the first integer set is greater than an average of the second integer set, or, a minimum value in the first integer set is greater than a minimum value in the second integer set.

In one embodiment, the first integer set and the second integer set are configured through the first higher-layer signaling.

Specifically, according to one aspect, the UE assumes that all physical layer signalings received in the second radio resource pool lack a first field compared with the first-type physical layer signaling, and the first field in the first-type physical layer signaling is used for multi-antenna related receiving in the second radio resource pool. The first field includes a positive integer number of information bit(s).

In one embodiment, the above method has a following benefit: through the restriction of the scope of the second radio resource pool, large-scope impacts brought to system performances by false alarms due to error detection are reduced.

In one embodiment, the UE assumes that all physical layer signalings received in the second radio resource set have no first field.

In one embodiment, candidate values for a number of REs occupied by one first-type physical layer signaling constitute a first integer set, and candidate values for a number of REs occupied by one second physical layer signaling constitute a second integer set. An average of the first integer set is greater than an average of the second integer set, or, a minimum value in the first integer set is greater than a minimum value in the second integer set.

In one embodiment, the first integer set and the second integer set are configured through the first higher-layer signaling.

The disclosure provides a method in a base station for multi-antenna transmission, wherein the method includes:
transmitting a first higher-layer signaling;
transmitting a first-type physical layer signaling in a first radio resource pool; and
transmitting second downlink information in a second radio resource pool.

Herein, the first higher-layer signaling is used for determining first information and second information, and the first information is used for multi-antenna related receiving in the first radio resource pool. The first-type physical layer signaling is detected, and the first-type physical layer signaling is used for multi-antenna related receiving in the second radio resource pool; or, the first-type physical layer signaling is not detected, and the second information is used for multi-antenna related receiving in the second radio resource pool. The second radio resource pool is related to the first radio resource pool.

In one embodiment, the multi-antenna related receiving employs a receiving beam corresponding to a transmitting beam employed by the base station.

In one embodiment, the multi-antenna related receiving employs a receiving scheme corresponding to a multi-antenna transmission scheme employed by the base station.

In one embodiment, the multi-antenna transmission scheme is one of an SFBC, an STBC, precoder cycling, or transmit beamforming.

In one embodiment, the base station transmits the first-type physical layer signaling on a control field in the first radio resource pool.

In one embodiment, a receiver of the first physical layer signaling monitors the first-type physical layer signaling in the first radio resource pool.

Specifically, according to one aspect of the disclosure, the first information is used for determining at least one of a first antenna port group or a first vector group; and the second information is used for determining at least one of a second antenna port group or a second vector group. The first antenna port group and the second antenna port group each include a positive integer number of antenna port(s). The first vector group and the second vector group each include a positive integer number of vector(s).

Specifically, according to one aspect of the disclosure, the first-type physical layer signaling is used for determining at least one of a third antenna port group or a third vector group. The third antenna port group includes a positive integer number of antenna port(s). The third vector group includes a positive integer number of vector(s).

Specifically, according to one aspect of the disclosure, the first higher-layer signaling is further used for determining the first radio resource pool and a second radio resource set, the first radio resource pool and the second radio resource set are orthogonal in time domain or frequency domain, and radio resources in the second radio resource pool are in the second radio resource set. The first-type physical layer signaling is not detected, the second information is used for multi-antenna related receiving in the second radio resource set; or, the first-type physical layer signaling is detected, the second information is used for multi-antenna related receiving in the second radio resource set other than the second radio resource pool.

Specifically, according to one aspect of the disclosure, the second downlink information includes a second physical layer signaling. The second physical layer signaling lacks a first field compared with the first-type physical layer signaling, and the first field in the first-type physical layer signaling is used for multi-antenna related receiving in the second radio resource pool. The first-type physical layer signaling and the second physical layer signaling correspond to a same signaling format. The first field includes a positive integer number of information bit(s).

Specifically, according to one aspect of the disclosure, all physical layer signalings transmitted in the second radio resource pool lack a first field compared with the first-type physical layer signaling, and the first field in the first-type physical layer signaling is used for multi-antenna related receiving in the second radio resource pool. The first field includes a positive integer number of information bit(s).

In one embodiment, all physical layer signalings transmitted in the second radio resource set lack a first field compared with the first-type physical layer signaling.

The disclosure provides a UE for multi-antenna transmission, wherein the UE includes:
  a first receiver, to receive a first higher-layer signaling;
  a second receiver, to monitor a first-type physical layer signaling in a first radio resource pool; and
  a third receiver, to receive second downlink information in a second radio resource pool.

Herein, the first higher-layer signaling is used for determining first information and second information, and the first information is used for multi-antenna related receiving in the first radio resource pool. The first-type physical layer signaling is detected, and the first-type physical layer signaling is used for multi-antenna related receiving in the second radio resource pool; or, the first-type physical layer signaling is not detected, and the second information is used for multi-antenna related receiving in the second radio resource pool. The second radio resource pool is related to the first radio resource pool.

In one embodiment, the above UE is characterized in that: the first information is used for determining at least one of a first antenna port group or a first vector group; and the second information is used for determining at least one of a second antenna port group or a second vector group. The first antenna port group and the second antenna port group each include a positive integer number of antenna port(s). The first vector group and the second vector group each include a positive integer number of vector(s).

In one embodiment, the above UE is characterized in that: the first-type physical layer signaling is used for determining at least one of a third antenna port group or a third vector group. The third antenna port group includes a positive integer number of antenna port(s). The third vector group includes a positive integer number of vector(s).

In one embodiment, the above UE is characterized in that: the first higher-layer signaling is further used for determining the first radio resource pool and a second radio resource set, the first radio resource pool and the second radio resource set are orthogonal in time domain or frequency domain, and radio resources in the second radio resource pool are in the second radio resource set. The first-type physical layer signaling is not detected, the second information is used for multi-antenna related receiving in the second radio resource set; or, the first-type physical layer signaling is detected, the second information is used for multi-antenna related receiving in the second radio resource set other than the second radio resource pool.

In one embodiment, the above UE is characterized in that: the second downlink information includes a second physical layer signaling. The second physical layer signaling lacks a first field compared with the first-type physical layer signaling, and the first field in the first-type physical layer signaling is used for multi-antenna related receiving in the second radio resource pool. The first-type physical layer signaling and the second physical layer signaling correspond to a same signaling format. The first field includes a positive integer number of information bit(s).

In one embodiment, the above UE is characterized in that: the UE assumes that all physical layer signalings received in the second radio resource pool lack a first field compared with the first-type physical layer signaling, and the first field in the first-type physical layer signaling is used for multi-antenna related receiving in the second radio resource pool. The first field includes a positive integer number of information bit(s).

The disclosure provides a base station for multi-antenna transmission, wherein the base station includes:
  a first transmitter, to transmit a first higher-layer signaling;
  a second transmitter, to transmit a first-type physical layer signaling in a first radio resource pool; and
  a third transmitter, to transmit second downlink information in a second radio resource pool.

Herein, the first higher-layer signaling is used for determining first information and second information, and the first information is used for multi-antenna related receiving in the first radio resource pool. The first-type physical layer signaling is detected, and the first-type physical layer signaling is used for multi-antenna related receiving in the second radio resource pool; or, the first-type physical layer signaling is not detected, and the second information is used for multi-antenna related receiving in the second radio resource pool. The second radio resource pool is related to the first radio resource pool.

In one embodiment, the above base station is characterized in that: the first information is used for determining at least one of a first antenna port group or a first vector group; and the second information is used for determining at least one of a second antenna port group or a second vector group. The first antenna port group and the second antenna port group each include a positive integer number of antenna port(s). The first vector group and the second vector group each include a positive integer number of vector(s).

In one embodiment, the above base station is characterized in that: the first-type physical layer signaling is used for determining at least one of a third antenna port group or a third vector group. The third antenna port group includes a positive integer number of antenna port(s). The third vector group includes a positive integer number of vector(s).

In one embodiment, the above base station is characterized in that: the first higher-layer signaling is further used for determining the first radio resource pool and a second radio resource set, the first radio resource pool and the second radio resource set are orthogonal in time domain or frequency domain, and radio resources in the second radio resource pool are in the second radio resource set. The first-type physical layer signaling is not detected, the second information is used for multi-antenna related receiving in the second radio resource set; or, the first-type physical layer signaling is detected, the second information is used for multi-antenna related receiving in the second radio resource set other than the second radio resource pool.

In one embodiment, the above base station is characterized in that: the second downlink information includes a second physical layer signaling. The second physical layer signaling lacks a first field compared with the first-type physical layer signaling, and the first field in the first-type physical layer signaling is used for multi-antenna related receiving in the second radio resource pool. The first-type physical layer signaling and the second physical layer signaling correspond to a same signaling format. The first field includes a positive integer number of information bit(s).

In one embodiment, the above base station is characterized in that: all physical layer signalings transmitted in the second radio resource pool lack a first field compared with the first-type physical layer signaling, and the first field in the first-type physical layer signaling is used for multi-antenna related receiving in the second radio resource pool. The first field includes a positive integer number of information bit(s).

In one embodiment, compared with conventional schemes, the disclosure has the following advantages.

Flexible and dynamic configuration of multi-antenna transmission is realized, which optimizes system performances.

Flexible and dynamic configuration of the radio resource pool corresponding to the multi-beam transmission is realized, which enhances system robustness.

The scope of the physical layer signaling used for beam change is restricted, and long-term damages caused to system performances by physical layer signaling false alarms are avoided.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

Embodiment 1

Figure 1:
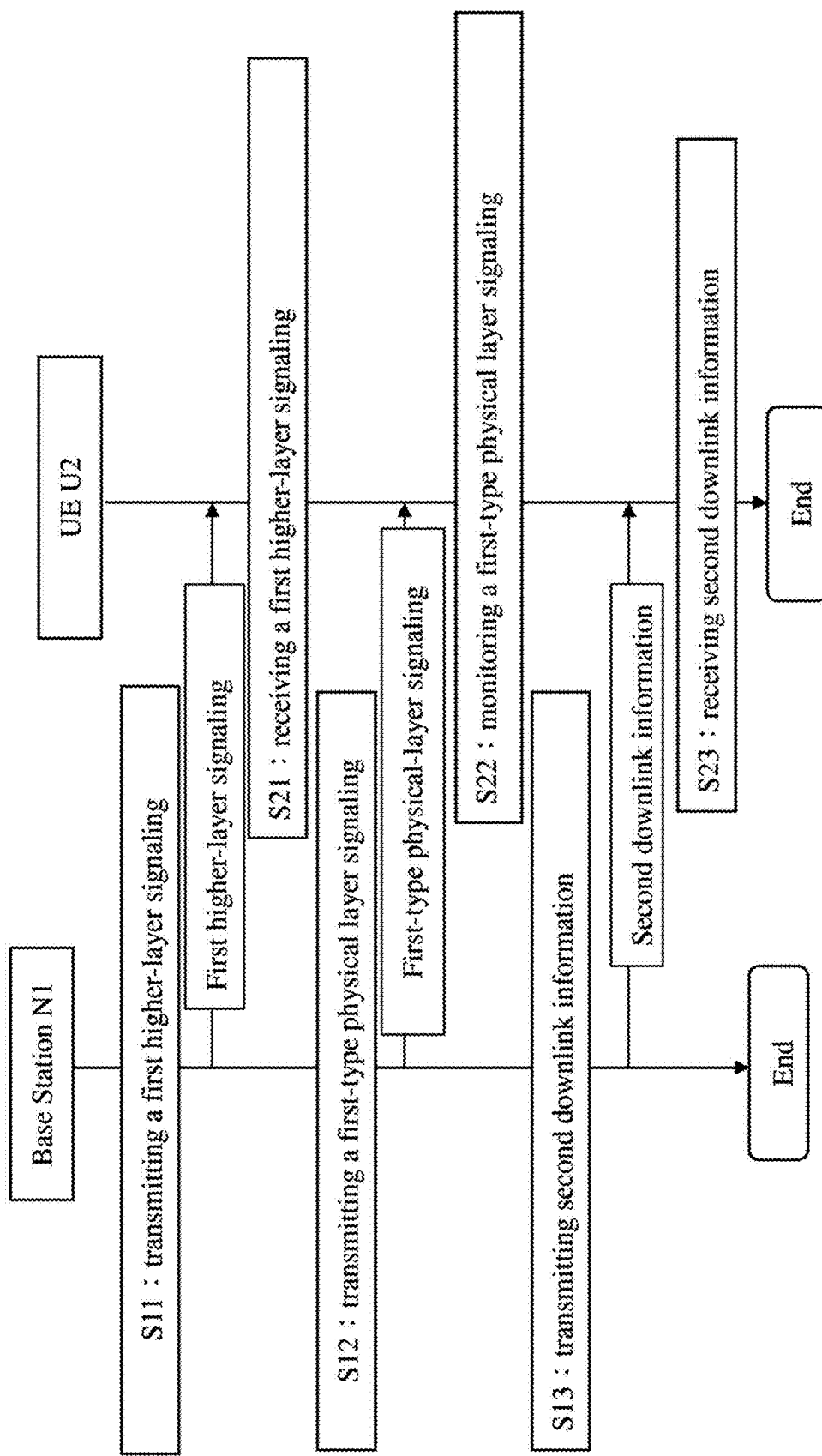
FIG. 1 is a flowchart of wireless transmission according to one embodiment of the disclosure.

Embodiment 1 illustrates an example of a flowchart of wireless transmission, as shown in FIG. 1. In FIG. 1, a base station N1 is a maintenance base station for a serving cell of a UE U2.

The N1 transmits a first higher-layer signaling in S11, transmits a first-type physical layer signaling in S12, and transmits second downlink information in S13.

The U2 receives a first higher-layer signaling in S21, monitors a first-type physical layer signaling in S22, and receives second downlink information in S23.

In Embodiment 1, the first higher-layer signaling is used by the U2 to determine first information and second information, and the first information is used by the U2 for multi-antenna related receiving in the first radio resource pool. The first-type physical layer signaling is detected by the U2 in S22, and the first-type physical layer signaling is used by the U2 for multi-antenna related receiving in the second radio resource pool; or, the first-type physical layer signaling is not detected by the U2 in S22, and the second information is used by the U2 for multi-antenna related receiving in the second radio resource pool. The second radio resource pool is related to the first radio resource pool.

In one embodiment, the first information is used by the U2 to determine at least one of a first antenna port group or a first vector group; and the second information is used by the U2 to determine at least one of a second antenna port group or a second vector group. The first antenna port group and the second antenna port group each include a positive integer number of antenna port(s). The first vector group and the second vector group each include a positive integer number of vector(s).

In one embodiment, the first-type physical layer signaling is used by the U2 to determine at least one of a third antenna port group or a third vector group. The third antenna port group includes a positive integer number of antenna port(s). The third vector group includes a positive integer number of vector(s).

In one embodiment, the first higher-layer signaling is further used by the U2 to determine the first radio resource pool and a second radio resource set, the first radio resource pool and the second radio resource set are orthogonal in time domain or frequency domain, and radio resources in the second radio resource pool are in the second radio resource set. The first-type physical layer signaling is not detected, the second information is used by the U2 for multi-antenna related receiving in the second radio resource set; or, the first-type physical layer signaling is detected, the second information is used by the U2 for multi-antenna related receiving in the second radio resource set other than the second radio resource pool.

In one embodiment, the second downlink information includes a second physical layer signaling. The second physical layer signaling lacks a first field compared with the first-type physical layer signaling, the first field in the first-type physical layer signaling is used by the U2 for multi-antenna related receiving in the second radio resource pool. The first-type physical layer signaling and the second physical layer signaling correspond to a same signaling format. The first field includes a positive integer number of information bit(s).

In one embodiment, the U2 assumes that all physical layer signalings received in the second radio resource pool lack a first field compared with the first-type physical layer signaling, and the first field in the first-type physical layer signaling is used by the U2 for multi-antenna related receiving in the second radio resource pool. The first field includes a positive integer number of information bit(s).

If no conflict is incurred, the above Embodiments 1-5 can be arbitrarily combined.

Embodiment 2

Figure 2:
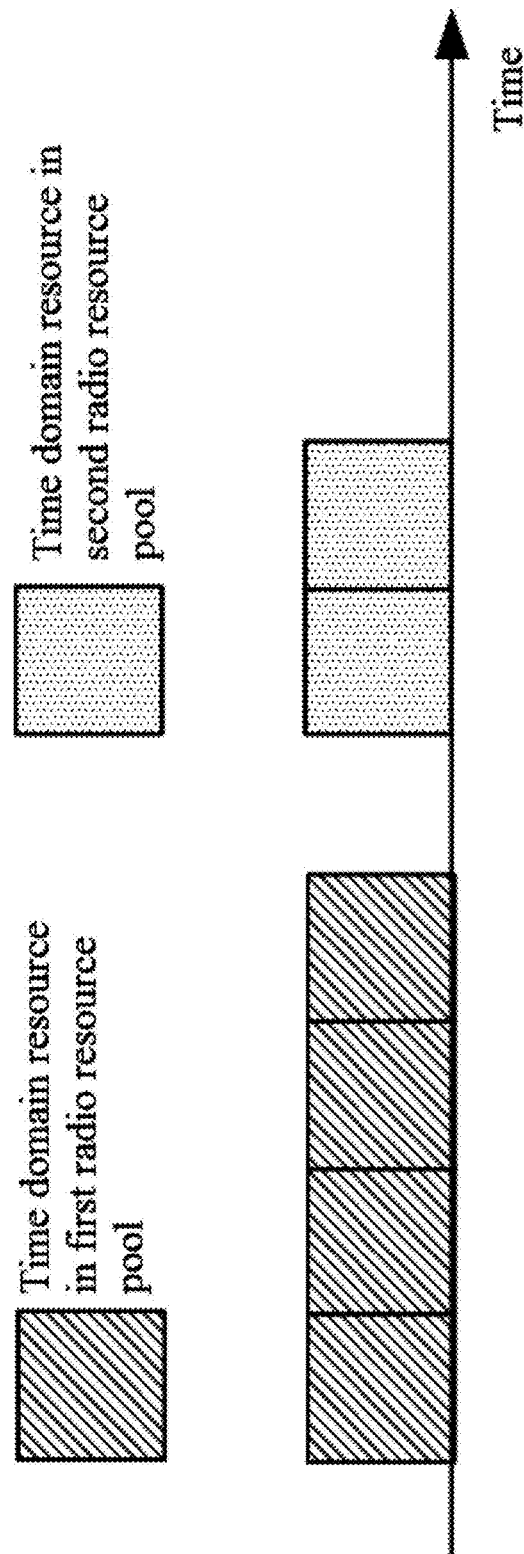
FIG. 2 is a diagram illustrating a correlation between a first radio resource pool and a second radio resource pool according to one embodiment of the disclosure.

Embodiment 2 illustrates an example of a diagram of a correlation between a first radio resource pool and a second radio resource pool, as shown in FIG. 2. In FIG. 2, a grid filled with slashes represents one time domain resource in a first radio resource pool, and a grid filled with dots represents one time domain resource in a second radio resource pool.

In Embodiment 2, time domain resources in the first radio resource pool and time domain resources in the second radio resource pool are orthogonal, and no time domain resource belongs to both the first radio resource pool and the second radio resource pool. In time domain, any one time domain resource in the second radio resource pool is behind any one time domain resource in the first radio resource pool.

In one embodiment, the time domain resource is a subframe.

In one embodiment, subframes in the second radio resource pool are N consecutive subframe(s) immediately after subframes in the first radio resource pool, and the N is a positive integer.

In one embodiment, the second radio resource pool and the first radio resource pool have an interval of K subframe(s), and the K is a positive integer.

In one embodiment, a first-type physical layer signaling transmitted on the radio resource in the first radio resource pool is used by the UE to determine the second radio resource pool.

Embodiment 3

Figure 3:
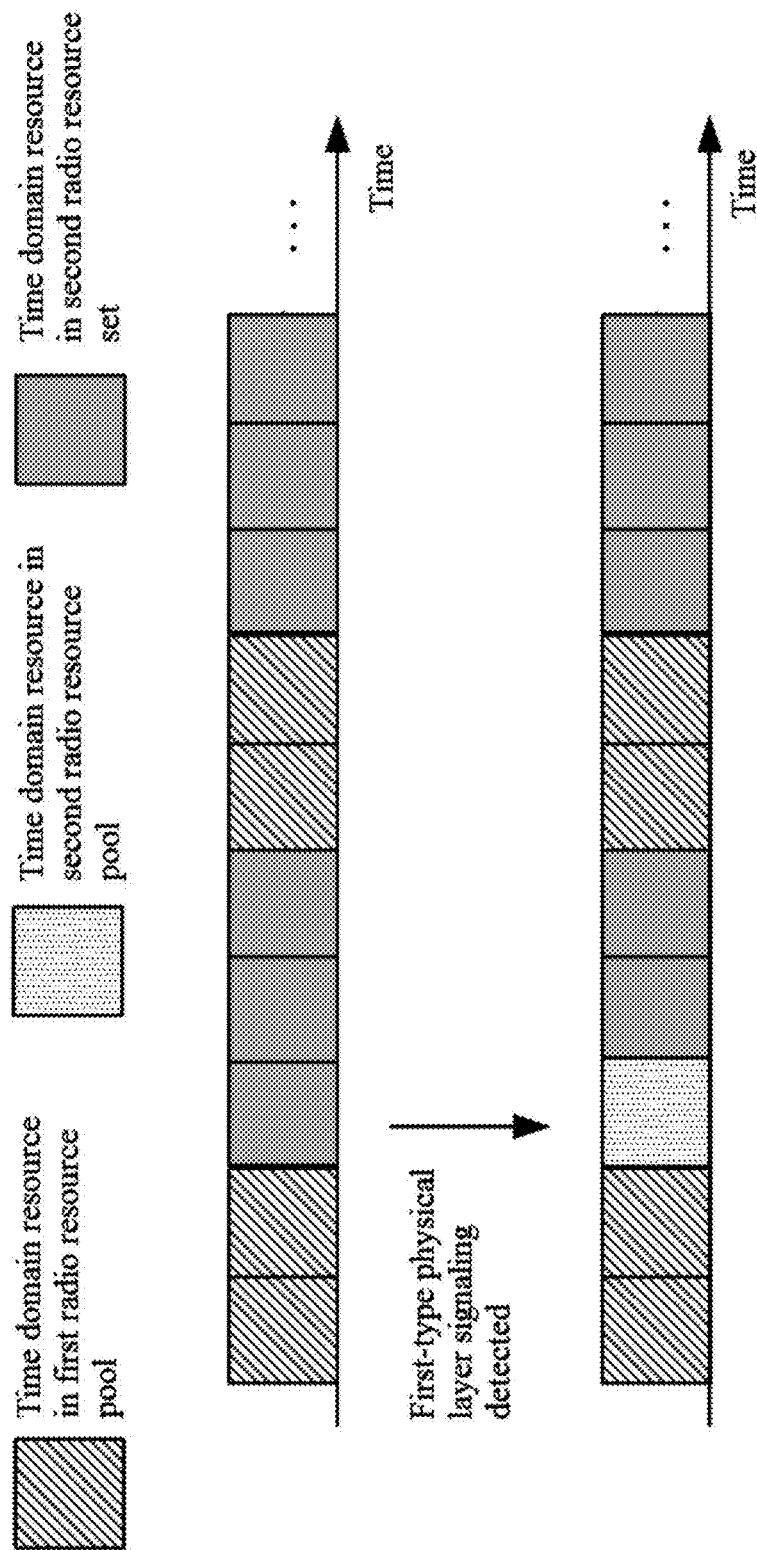
FIG. 3 is a diagram illustrating a relationship between a first radio resource pool, a second radio resource pool and a second radio resource set according to one embodiment of the disclosure.

Embodiment 3 illustrates an example of a relationship between a first radio resource pool, a second radio resource pool and a second radio resource set, as shown in FIG. 3. In FIG. 3, a grid filled with slashes represents one time domain resource in a first radio resource pool, a grid filled with dots represents one time domain resource in a second radio resource pool, and a gray grid represents one time domain resource in a second radio resource set.

In Embodiment 3, a first higher-layer signaling is used by the UE to determine a first radio resource pool and a second radio resource set, the first radio resource pool and the second radio resource set are orthogonal in time domain, the second radio resource pool and the second radio resource set are orthogonal in time domain, and radio resources in the second radio resource pool are in the second radio resource set. The UE monitors a first-type physical layer signaling in the first radio resource pool. If the UE detects the first-type physical layer signaling, partial time domain resources in the second radio resource set are determined to be time domain resources in the second radio resource pool.

In one embodiment, the first-type physical layer signaling is further used by the UE to determine multi-antenna related receiving in the second radio resource pool.

In one embodiment, time domain resources in the first radio resource pool and the second radio resource pool occur periodically, time domain resources in the second radio resource pool are N consecutive subframe(s) in the second radio resource set, and the N is a positive integer.

In one embodiment, the second radio resource pool is the earliest N consecutive subframe(s) in the second radio resource set that occur after the first-type physical layer signaling, and the N is a positive integer.

Embodiment 4

Figure 4:
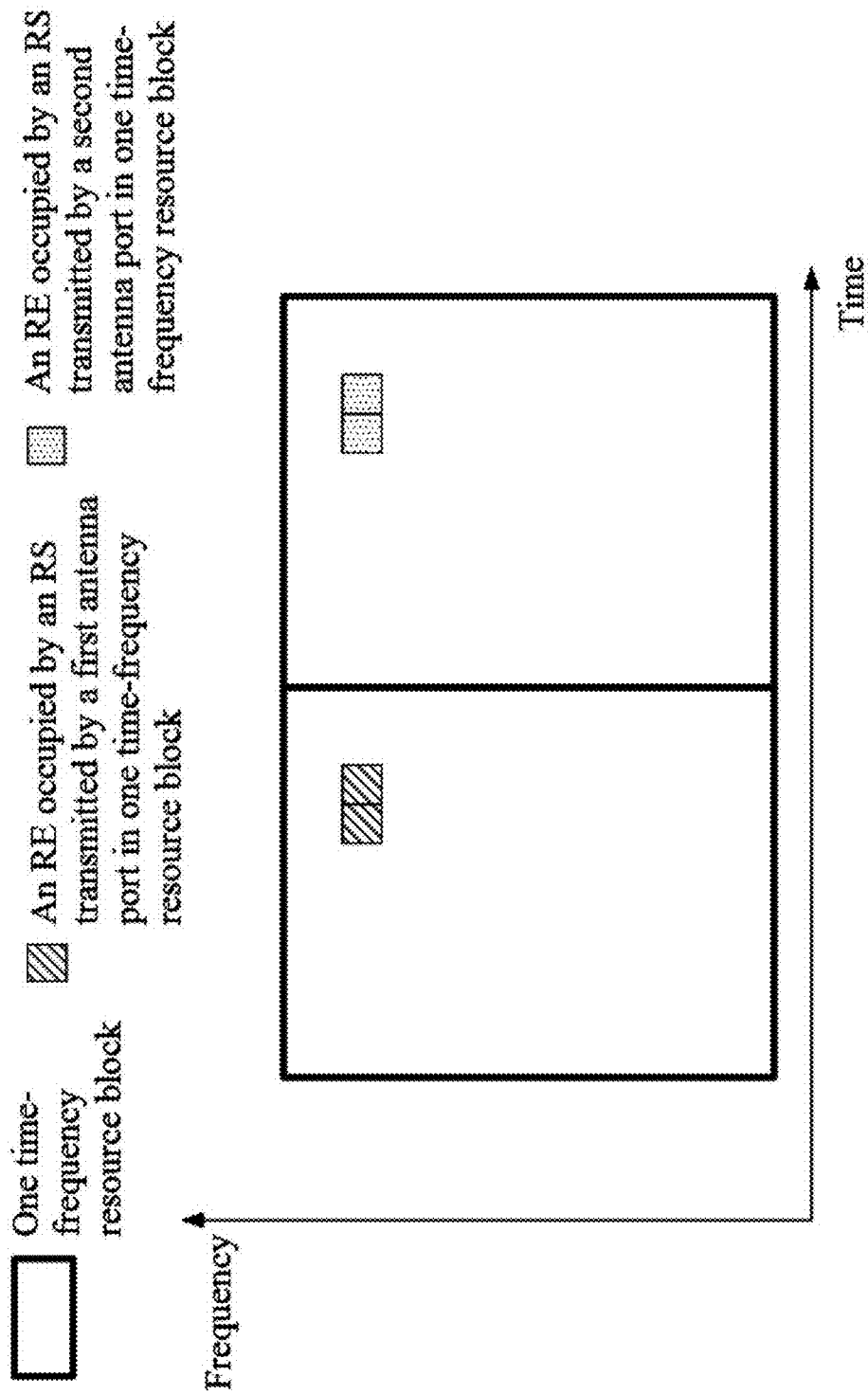
FIG. 4 is a diagram illustrating a Reference Signal (RS) transmitted in one radio resource block by an antenna port according to one embodiment of the disclosure.

Embodiment 4 illustrates an example of a Reference Signal (RS) transmitted in one radio resource block using an antenna port, as shown in FIG. 4. In FIG. 4, a box having a bold frame represents one time-frequency resource block, a little grid filled with slashes represents an RE occupied by an RS transmitted in one time-frequency resource block by a first antenna port, and a grid filled with dots represents an RE occupied by an RS transmitted in one time-frequency resource block by a second antenna port. The first antenna port and the second antenna port are two different antenna ports in the disclosure.

In one embodiment, the time-frequency resource block includes 12 subcarriers in frequency domain.

In one embodiment, the time-frequency resource block includes 14 OFDM symbols in time domain.

In one embodiment, a pattern of an RS transmitted by the first antenna port in the time-frequency resource block is the same as a pattern of an RS transmitted by the second antenna port in the time-frequency resource block.

In one embodiment, the time-frequency resource block is a Physical Resource Block (PRB), a pattern of an RS transmitted by the first antenna port in the time-frequency resource block is a pattern of a CSI-RS in a PRB, and a pattern of an RS transmitted by the second antenna port in the time-frequency resource block is a pattern of a CSI-RS in a PRB.

Embodiment 5

Figure 5:
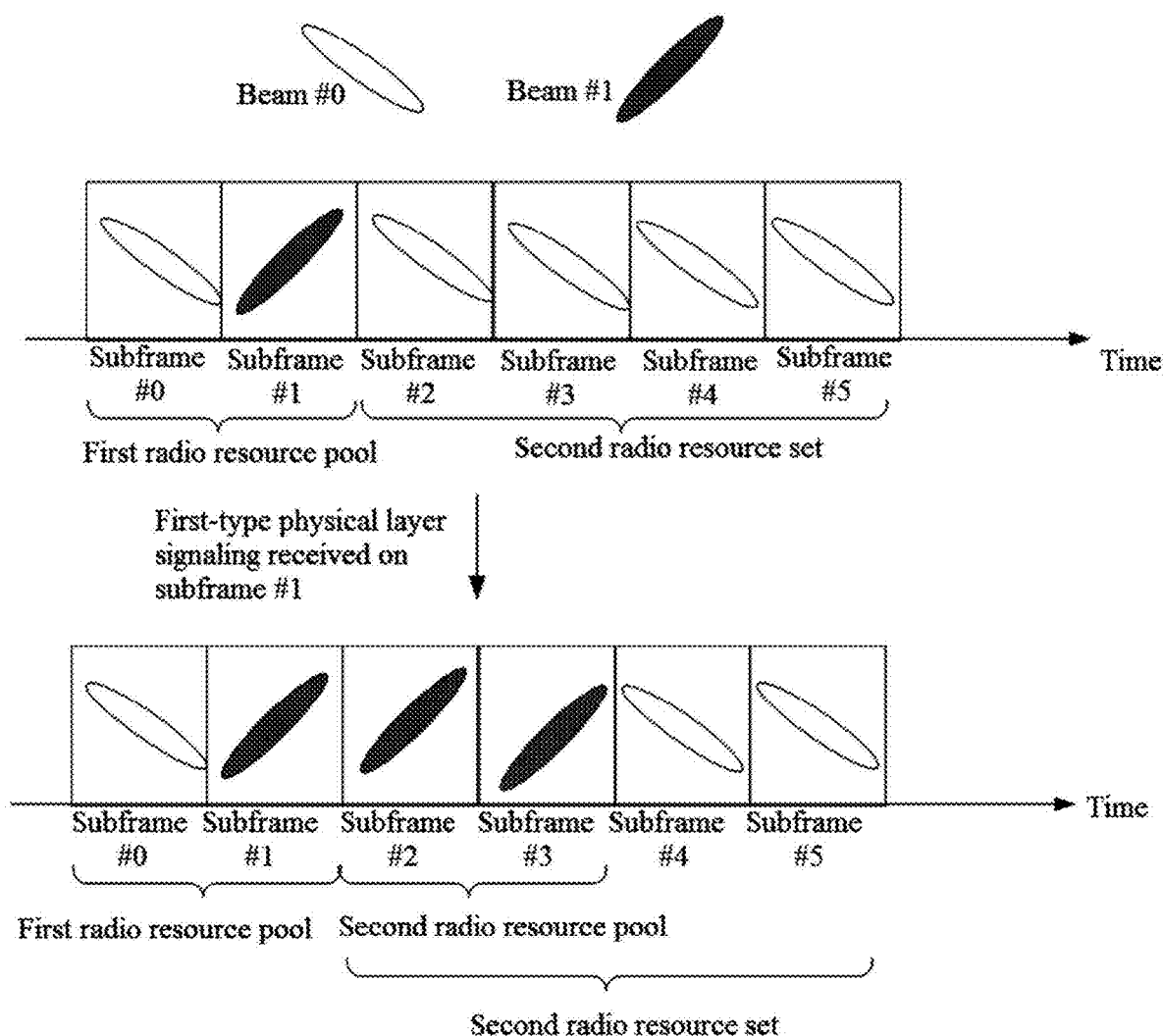
FIG. 5 is a diagram illustrating a case in which a first-type physical layer signaling is used for indicating multi-antenna related receiving of a UE according to one embodiment of the disclosure.

Embodiment 5 illustrates an example of a case in which a first-type physical layer signaling is used for indicating multi-antenna related receiving of a UE, as shown in FIG. 5. In FIG. 5, a white ellipse represents a receiving beam #0 of the UE, a netted ellipse represents a receiving beam #1 of the UE, the beam #0 and the beam #1 have different receiving directions.

In Embodiment 5, the UE receives a first higher-layer signaling, and the first higher-layer signaling is used for determining first information and second information. The first information is used for determining: a first radio resource pool consists of a subframe #0 and a subframe #1; the beam #0 is used for receiving on the subframe #0 in the first radio resource pool, and the beam #1 is used for receiving on the subframe #1 in the first radio resource pool. The second information is used for determining: a second radio resource set consists of subframes #2 to #5; when no first-type physical layer signaling is detected, the UE receives using the beam #0 on the subframes #2 to #5 in the second radio resource set; when a first-type physical layer signaling is detected, the first-type physical layer signaling is used for determining a receiving beam used in a second radio resource pool, and the beam #0 is used for receiving in the second radio resource set other than the second radio resource pool.

In Embodiment 5, the UE monitors a first-type physical layer signaling on the subframe #0 and the subframe #1 using the beam #0 and the beam #1 respectively, and detects the first-type physical layer signaling on the subframe #1; the first-type physical layer signaling is used for determining that the UE receives using the beam #1 in the second radio resource pool composed of the subframe #2 and the subframe #3, and the beam #0 is stilled used for receiving in the second radio resource set (that is, subframes #4 and #5) other than the second radio resource pool.

In one embodiment, the first higher-layer signaling is used by the UE to determine the second radio resource pool.

In one embodiment, the first-type physical layer signaling is used by the UE to determine the second radio resource pool.

In one embodiment, the first information is used by the UE to determine a first vector group, and the second information is used by the UE to determine a second vector group. The first vector group is used for receiving beamforming in the first radio resource pool. When no first-type physical layer signaling is detected, the second vector group is used for receiving beamforming in the second radio resource set; when a first-type physical layer signaling is detected, the second vector group is used for receiving beamforming in the second radio resource set other than the second radio resource pool; the first-type physical layer signaling is used for determining a third vector group, and the third vector group is used for receiving beamforming in the second radio resource pool. The first vector group is composed of a vector corresponding to the beam #0 and a vector corresponding to the beam #1. The second vector group includes a vector corresponding to the beam #0 only. The third vector group includes a vector corresponding to the beam #1 only.

In one embodiment, when detecting that the quality of reception corresponding to the beam #0 on the subframe #0 degrades, the base station transmits the first-type physical layer signaling on the subframe #1 using the beam #1 to notify the UE to receive in the second radio resource pool using the beam #1.

Embodiment 6

Figure 6:
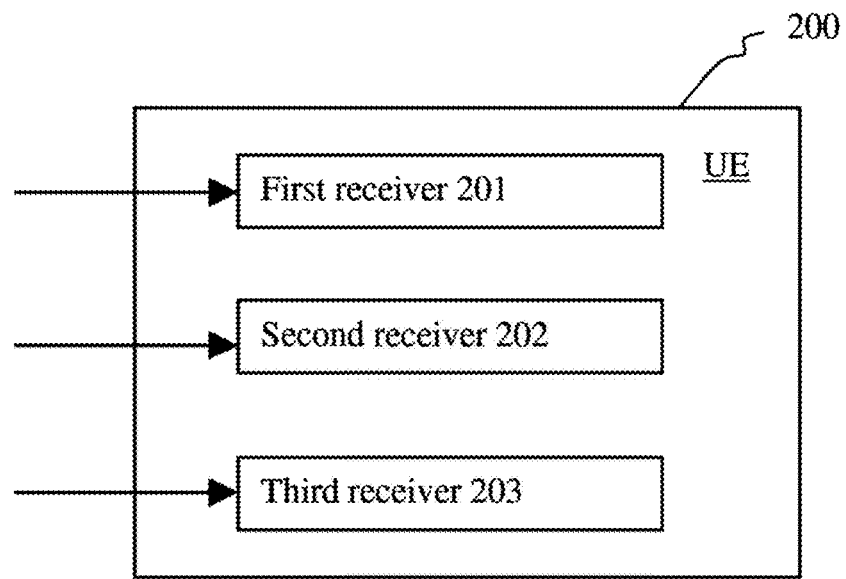
FIG. 6 is a structure block diagram illustrating a processing device in a UE according to one embodiment of the disclosure.

Embodiment 6 illustrates an example of a structure block diagram of a processing device in a UE, as shown in FIG. 6. In FIG. 6, the processing device 200 in the UE is mainly composed of a first receiver 201, a second receiver 202, and a third receiver 203.

In Embodiment 6, the first receiver 201 receives a first higher-layer signaling; the second receiver 202 monitors a first-type physical layer signaling in a first radio resource pool; and the third receiver 203 receives second downlink information in a second radio resource pool.

In Embodiment 6, the first higher-layer signaling is used for determining first information and second information, and the first information is used for multi-antenna related receiving in the first radio resource pool. The first-type physical layer signaling is detected, and the first-type physical layer signaling is used for multi-antenna related receiving in the second radio resource pool; or, the first-type physical layer signaling is not detected, and the second information is used for multi-antenna related receiving in the second radio resource pool. The second radio resource pool is related to the first radio resource pool.

In one embodiment, the first information is used for determining at least one of a first antenna port group or a first vector group; and the second information is used for determining at least one of a second antenna port group or a second vector group. The first antenna port group and the second antenna port group each include a positive integer number of antenna port(s). The first vector group and the second vector group each include a positive integer number of vector(s).

In one embodiment, the first-type physical layer signaling is used for determining at least one of a third antenna port group or a third vector group. The third antenna port group includes a positive integer number of antenna port(s). The third vector group includes a positive integer number of vector(s).

In one embodiment, the first higher-layer signaling is further used for determining the first radio resource pool and a second radio resource set, the first radio resource pool and the second radio resource set are orthogonal in time domain or frequency domain, and radio resources in the second radio resource pool are in the second radio resource set. The first-type physical layer signaling is not detected, the second information is used for multi-antenna related receiving in the second radio resource set; or, the first-type physical layer signaling is detected, the second information is used for multi-antenna related receiving in the second radio resource set other than the second radio resource pool.

In one embodiment, the second downlink information includes a second physical layer signaling. The second physical layer signaling lacks a first field compared with the first-type physical layer signaling, and the first field in the first-type physical layer signaling is used for multi-antenna related receiving in the second radio resource pool. The first-type physical layer signaling and the second physical layer signaling correspond to a same signaling format. The first field includes a positive integer number of information bit(s).

In one embodiment, the UE assumes that all physical layer signalings received in the second radio resource pool lack a first field compared with the first-type physical layer signaling, and the first field in the first-type physical layer signaling is used for multi-antenna related receiving in the second radio resource pool. The first field includes a positive integer number of information bit(s).

In one embodiment, the first receiver 201 includes at least the former two of a receiver 456, a receiving processor 452 and a controller/processor 490 mentioned in Embodiment 11.

In one embodiment, the second receiver 202 includes a receiver 456 and a receiving processor 452 mentioned in Embodiment 11.

In one embodiment, the third receiver 203 includes at least the former two of a receiver 456, a receiving processor 452 and a controller/processor 490 mentioned in Embodiment 11, which are used for receiving the second downlink information in the disclosure.

Embodiment 7

Figure 7:
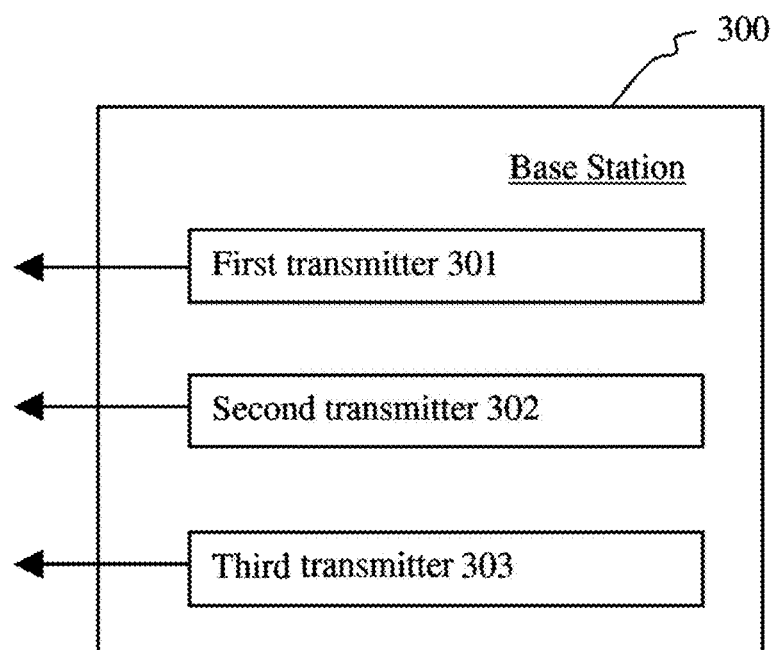
FIG. 7 is a structure block diagram illustrating a processing device in a base station according to one embodiment of the disclosure.

Embodiment 7 illustrates an example of a structure block diagram of a processing device in a base station, as shown in FIG. 7. In FIG. 7, the processing device 300 in the base station is mainly composed of a first transmitter 301, a second transmitter 302, and a third transmitter 303.

In Embodiment 7, the first transmitter 301 transmits a first higher-layer signaling; the second transmitter 302 transmits a first-type physical layer signaling in a first radio resource pool; and the third transmitter 303 transmits second downlink information in a second radio resource pool.

In Embodiment 7, the first higher-layer signaling is used for determining first information and second information, and the first information is used for multi-antenna related receiving in the first radio resource pool. The first-type physical layer signaling is detected, and the first-type physical layer signaling is used for multi-antenna related receiving in the second radio resource pool; or, the first-type physical layer signaling is not detected, and the second information is used for multi-antenna related receiving in the second radio resource pool. The second radio resource pool is related to the first radio resource pool.

In one embodiment, the first information is used for determining at least one of a first antenna port group or a first vector group; and the second information is used for determining at least one of a second antenna port group or a second vector group. The first antenna port group and the second antenna port group each include a positive integer number of antenna port(s). The first vector group and the second vector group each include a positive integer number of vector(s).

In one embodiment, the first-type physical layer signaling is used for determining at least one of a third antenna port group or a third vector group. The third antenna port group includes a positive integer number of antenna port(s). The third vector group includes a positive integer number of vector(s).

In one embodiment, the first higher-layer signaling is further used for determining the first radio resource pool and a second radio resource set, the first radio resource pool and the second radio resource set are orthogonal in time domain or frequency domain, and radio resources in the second radio resource pool are in the second radio resource set. The first-type physical layer signaling is not detected, the second information is used for multi-antenna related receiving in the second radio resource set; or, the first-type physical layer signaling is detected, the second information is used for multi-antenna related receiving in the second radio resource set other than the second radio resource pool.

In one embodiment, the second downlink information includes a second physical layer signaling. The second physical layer signaling lacks a first field compared with the first-type physical layer signaling, and the first field in the first-type physical layer signaling is used for multi-antenna related receiving in the second radio resource pool. The first-type physical layer signaling and the second physical layer signaling correspond to a same signaling format. The first field includes a positive integer number of information bit(s).

In one embodiment, all physical layer signalings transmitted in the second radio resource pool lack a first field compared with the first-type physical layer signaling, and the first field in the first-type physical layer signaling is used for multi-antenna related receiving in the second radio resource pool. The first field includes a positive integer number of information bit(s).

In one embodiment, the first transmitter includes at least the former two of a transmitter 416, a transmitting processor 415 and a controller/processor 440 mentioned in Embodiment 11.

In one embodiment, the second transmitter includes a transmitter 416 and a transmitting processor 415 mentioned in Embodiment 11.

In one embodiment, the third transmitter includes at least the former two of a transmitter 416, a transmitting processor 415 and a controller/processor 440 mentioned in Embodiment 11.

Embodiment 8

Figure 8:
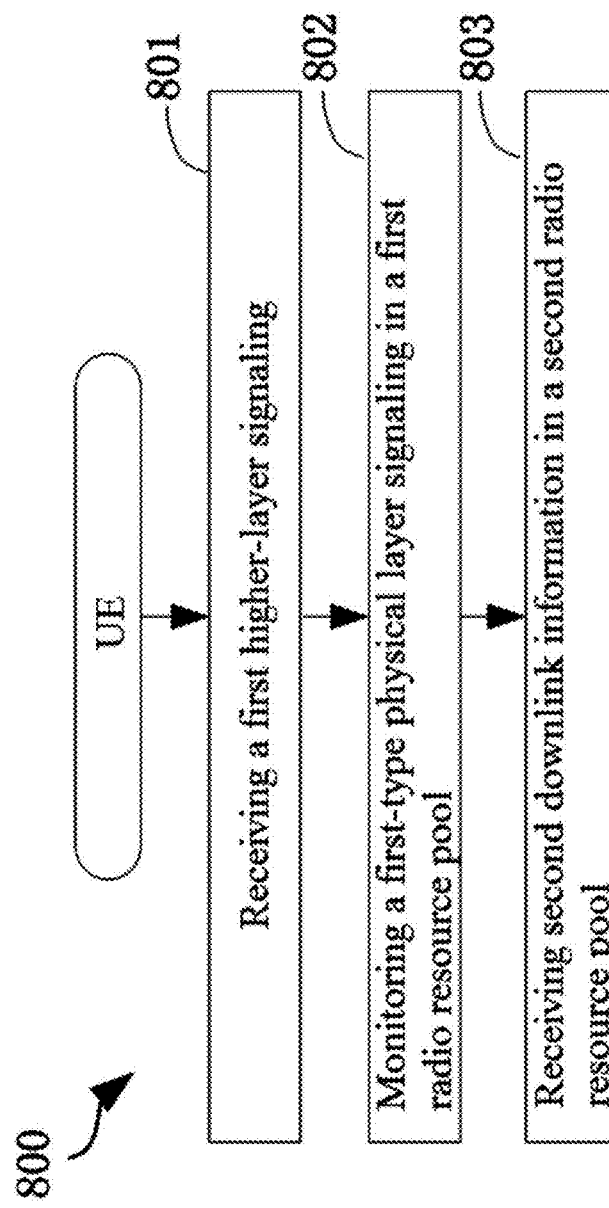
FIG. 8 is a flowchart of a first higher-layer signaling, a first-type physical layer signaling and second downlink information according to one embodiment of the disclosure.

Embodiment 8 illustrates an example of a flowchart of a first higher-layer signaling, a first-type physical layer signaling and second downlink information, as shown in FIG. 8. In 800 shown in FIG. 8, each box represents a step. Particularly, the order of the steps in the boxes does not represent a particular sequence of time between each step.

In Embodiment 8, the UE in the disclosure receives a first higher-layer signaling in S801, monitors a first-type physical layer signaling in a first radio resource pool in S802, and receives second downlink information in a second radio resource pool in S803. Herein, the first higher-layer signaling is used for determining first information and second information, and the first information is used for multi-antenna related receiving in the first radio resource pool. The first-type physical layer signaling is detected, and the first-type physical layer signaling is used for multi-antenna related receiving in the second radio resource pool; or, the first-type physical layer signaling is not detected, and the second information is used for multi-antenna related receiving in the second radio resource pool. The second radio resource pool is related to the first radio resource pool.

In one embodiment, the first information is used for determining at least one of a first antenna port group or a first vector group; the second information is used for determining at least one of a second antenna port group or a second vector group; the first antenna port group and the second antenna port group each include a positive integer number of antenna port(s); the first vector group and the second vector group each include a positive integer number of vector(s).

In one embodiment, the first-type physical layer signaling is used for determining at least one of a third antenna port group or a third vector group; the third antenna port group includes a positive integer number of antenna port(s); and the third vector group includes a positive integer number of vector(s).

In one embodiment, the first higher-layer signaling is further used for determining the first radio resource pool and a second radio resource set, the first radio resource pool and the second radio resource set are orthogonal in time domain or frequency domain, and radio resources in the second radio resource pool are in the second radio resource set; the first-type physical layer signaling is not detected, the second information is used for multi-antenna related receiving in the second radio resource set, or, the first-type physical layer signaling is detected, the second information is used for multi-antenna related receiving in the second radio resource set other than the second radio resource pool.

In one embodiment, the second downlink information includes a second physical layer signaling; the second physical layer signaling lacks a first field compared with the first-type physical layer signaling, the first field in the first-type physical layer signaling is used for multi-antenna related receiving in the second radio resource pool; the first-type physical layer signaling and the second physical layer signaling correspond to a same signaling format; and the first field includes a positive integer number of information bit(s).

In one embodiment, the UE assumes that all physical layer signalings received in the second radio resource pool lack a first field compared with the first-type physical layer signaling, the first field in the first-type physical layer signaling is used for multi-antenna related receiving in the second radio resource pool, and the first field includes a positive integer number of information bit(s).

Embodiment 9

Figure 9:
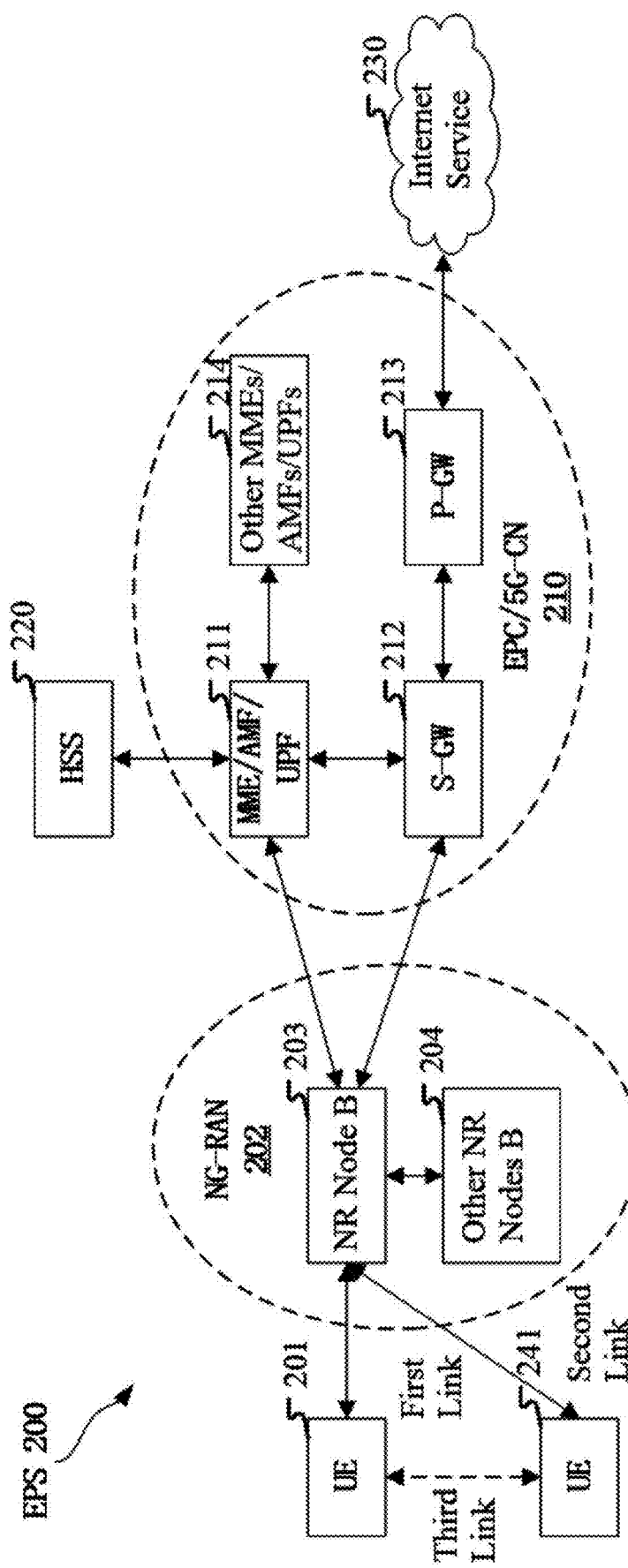
FIG. 9 is a diagram illustrating a network architecture according to one embodiment of the disclosure.

Embodiment 9 illustrates an example of a network architecture, as shown in FIG. 9.

FIG. 9 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 9, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the UE in the disclosure.

In one embodiment, the gNB 203 corresponds to the base station in the disclosure.

In one embodiment, the UE 201 supports multi-antenna transmission.

In one embodiment, the gNB 203 supports multi-antenna transmission.

Embodiment 10

Figure 10:
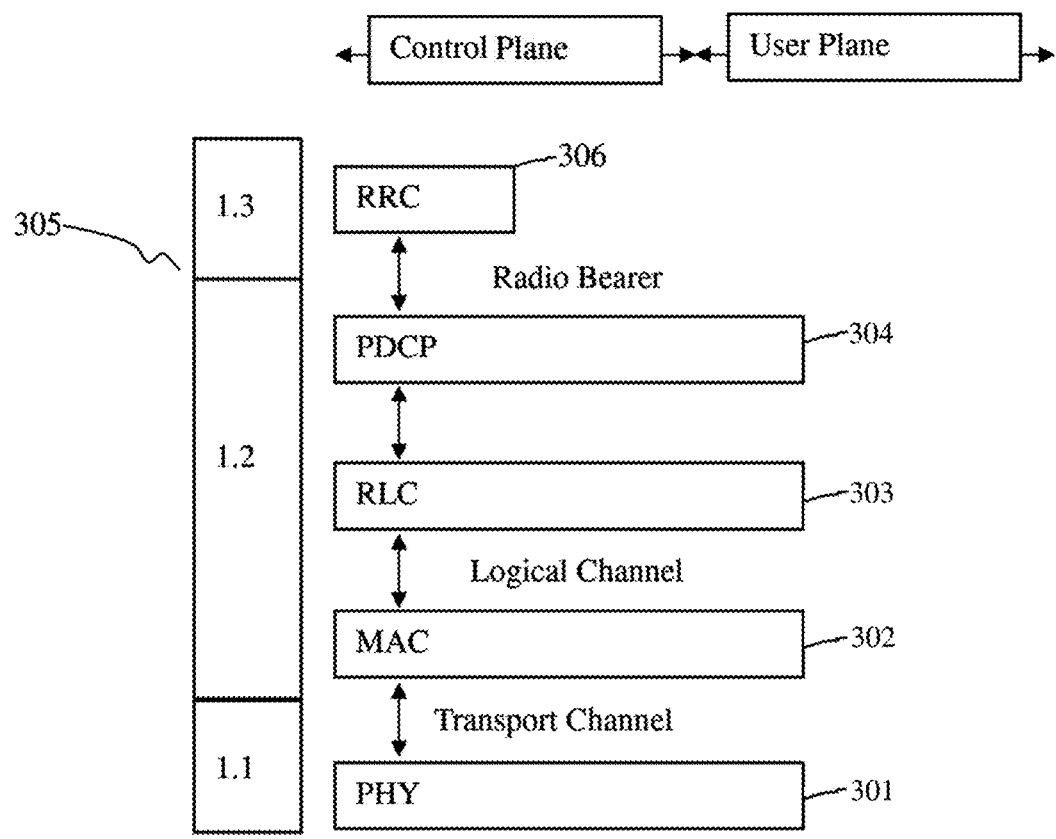
FIG. 10 is a diagram illustrating a radio protocol architecture of a user plane and a control plane according to one embodiment of the disclosure.

Embodiment 10 illustrates an example of a radio protocol architecture of a user plane and a control plane, as shown in FIG. 10.

FIG. 10 is a diagram illustrating an embodiment of a radio protocol architecture of a user plane and a control plane. In FIG. 10, the radio protocol architecture of a UE and a base station (gNB or eNB) is represented by three layers, which are a Layer 1, a Layer 2 and a Layer 3 respectively. The Layer 1 (L1 layer) 301 is the lowest layer and implements various PHY (physical layer) signal processing functions.

The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 10, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNB s. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 10 is applicable to the UE in the disclosure.

In one embodiment, the radio protocol architecture shown in FIG. 10 is applicable to the base station in the disclosure.

In one embodiment, the first higher-layer signaling in the disclosure is generated by the RRC sublayer 306.

In one embodiment, the first-type physical layer signaling in the disclosure is generated by the PHY 301.

In one embodiment, the second downlink information in the disclosure is generated by the PDCP sublayer 304.

Embodiment 11

Figure 11:
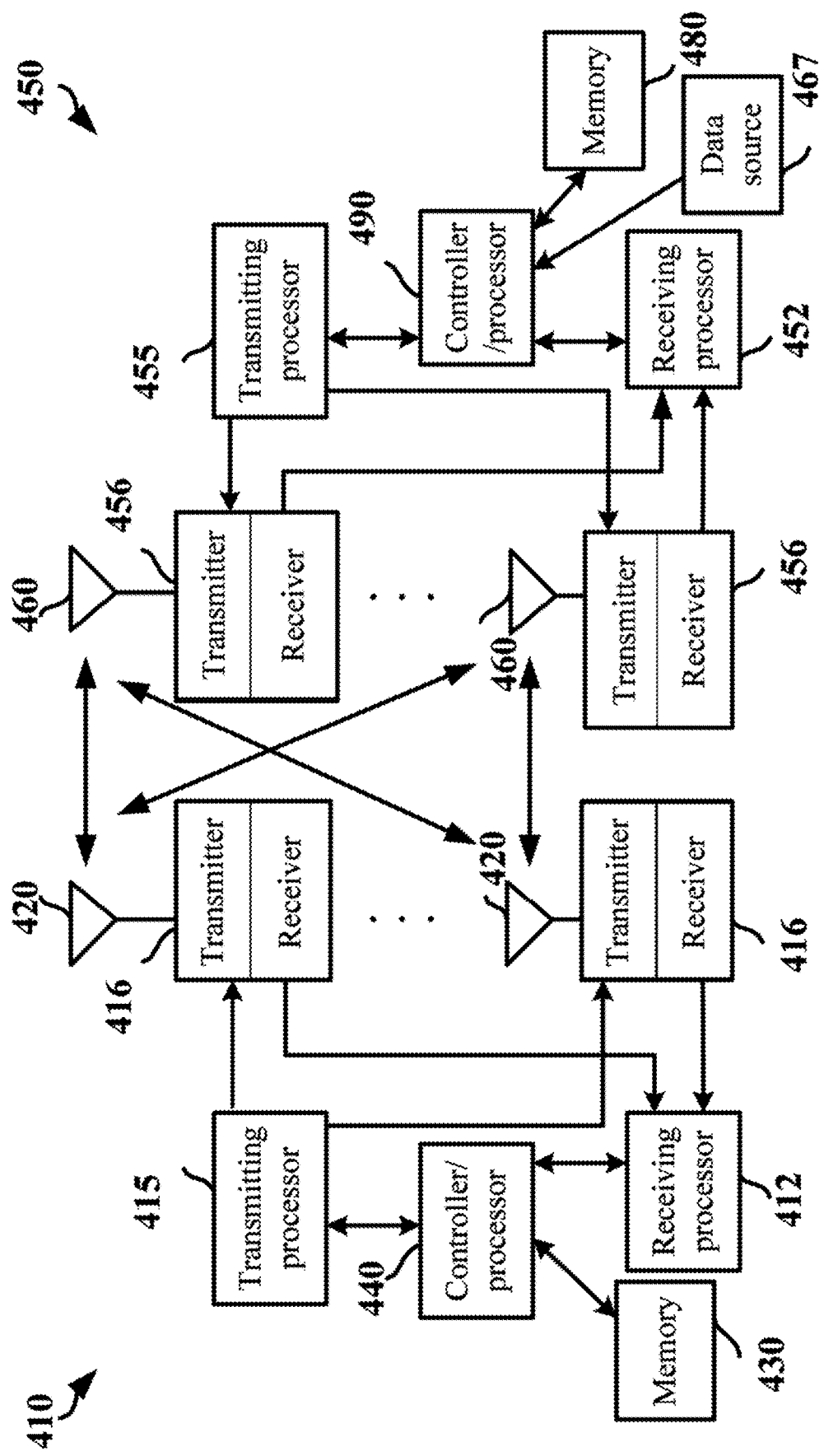
FIG. 11 is a diagram illustrating a base station and a given UE according to one embodiment of the disclosure.

Embodiment 11 illustrates an example of a base station and a UE, as shown in FIG. 11. FIG. 11 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In uplink transmission, processes relevant to the base station device 410 include the following.

The receiver 416 receives a radio-frequency signal through the corresponding antenna 420, converts the received radio-frequency signal into a baseband signal, and provides the baseband signal to the receiving processor 412.

The receiving processor 412 performs various signal receiving processing functions of L1 layer (that is, PHY), such as decoding, de-interleaving, descrambling, demodulation, extraction of physical layer control signalings, etc.

The receiving processor 412 performs various signal receiving processing functions of L1 layer (that is, PHY), such as multi-antenna receiving, despreading, code division multiplexing, precoding, etc.

The controller/processor 440 performs functions of L2 layer, and is connected to the memory 430 that stores program codes and data.

The controller/processor 440 provides multiplexing between a transport channel and a logical channel, packet reassembling, decryption, header decompression, and control signal processing so as to recover a higher-layer packet coming from the UE 450. The higher-layer packet from the controller/processor 440 may be provided to a core network.

In UL transmission, processes relevant to the UE 450 include the following.

The data source 467 provides a higher-layer packet to the controller/processor 490. The data source 467 illustrates all protocol layers above L2 layer.

The transmitter 456 transmits a radio-frequency signal through the corresponding antenna 460, converts a baseband signal into a radio-frequency signal and provides the radio-frequency signal to the corresponding antenna 460.

The transmitting processor 455 performs various signal transmitting processing functions of L1 layer (that is, PHY), including encoding, interleaving, scrambling, modulation, generation of physical layer signalings, etc.

The transmitting processor 455 performs various signal transmitting processing functions of L1 layer (that is, PHY), including multi-antenna transmitting, spreading, code division multiplexing, precoding, etc.

The controller/processor 490 performs header compression, encryption, packet segmentation and reordering, and multiplexing between a logical channel and a transport channel based on the radio resource allocation of the gNB 410, and performs functions of Layer 2 used for the user plane and the control plane.

The controller/processor 490 is also in charge of HARQ operation, retransmission of lost packets, and signalings to the eNB 410.

In Downlink (DL) transmission, processes relevant to the base station device 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit used for transmission requirements. The scheduling unit is configured to schedule air interface resources corresponding to transmission requirements.

The controller/processor 440 determines to transmit downlink signalings/data to be transmitted, and sends the result to the transmitting processor 415.

The transmitting processor 415 receives a bit stream output from the controller/processor 440, and performs various signal transmitting processing functions of L1 layer (that is, PHY), including encoding, interleaving, scrambling, modulation, precoding, power control/allocation, generation of physical layer control signalings (including PBCH, PDCCH, PHICH, PCFICH, reference signal), etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs various signal receiving processing functions of L1 layer (that is, PHY), including multi-antenna receiving, demodulation, descrambling, de-interleaving, decoding, extraction of physical layer control signalings, etc.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

In one embodiment, the UE 450 includes at least one processor and at least one memory. The at least one memory includes computer program codes. The at least one memory and the computer program codes are configured to be used in collaboration with the at least one processor. The UE 450 at least receives a first higher-layer signaling, monitors a first-type physical layer signaling in a first radio resource pool, and receives second downlink information in a second radio resource pool; wherein the first higher-layer signaling is used for determining first information and second information, and the first information is used for multi-antenna related receiving in the first radio resource pool; the first-type physical layer signaling is detected, and the first-type physical layer signaling is used for multi-antenna related receiving in the second radio resource pool, or, the first-type physical layer signaling is not detected, and the second information is used for multi-antenna related receiving in the second radio resource pool; and the second radio resource pool is related to the first radio resource pool.

In one embodiment, the UE 450 includes a memory that stores a computer readable instruction program. The computer readable instruction program generates an action when executed by at least one processor. The action includes: receiving a first higher-layer signaling, monitoring a first-type physical layer signaling in a first radio resource pool, and receiving second downlink information in a second radio resource pool; wherein the first higher-layer signaling is used for determining first information and second information, and the first information is used for multi-antenna related receiving in the first radio resource pool; the first-type physical layer signaling is detected, and the first-type physical layer signaling is used for multi-antenna related receiving in the second radio resource pool, or, the first-type physical layer signaling is not detected, and the second information is used for multi-antenna related receiving in the second radio resource pool; and the second radio resource pool is related to the first radio resource pool.

In one embodiment, the gNB 410 includes at least one processor and at least one memory. The at least one memory includes computer program codes. The at least one memory and the computer program codes are configured to be used in collaboration with the at least one processor. The gNB 410 at least transmits a first higher-layer signaling, transmits a first-type physical layer signaling in a first radio resource pool, and transmits second downlink information in a second radio resource pool. Herein, the first higher-layer signaling is used for determining first information and second information, and the first information is used for multi-antenna related receiving in the first radio resource pool; the first-type physical layer signaling is detected, and the first-type physical layer signaling is used for multi-antenna related receiving in the second radio resource pool, or, the first-type physical layer signaling is not detected, and the second information is used for multi-antenna related receiving in the second radio resource pool; and the second radio resource pool is related to the first radio resource pool.

In one embodiment, the gNB 410 includes a memory that stores a computer readable instruction program. The computer readable instruction program generates an action when executed by at least one processor. The action includes: transmitting a first higher-layer signaling, transmitting a first-type physical layer signaling in a first radio resource pool, and transmitting second downlink information in a second radio resource pool. Herein, the first higher-layer signaling is used for determining first information and second information, and the first information is used for multi-antenna related receiving in the first radio resource pool; the first-type physical layer signaling is detected, and the first-type physical layer signaling is used for multi-antenna related receiving in the second radio resource pool, or, the first-type physical layer signaling is not detected, and the second information is used for multi-antenna related receiving in the second radio resource pool; and the second radio resource pool is related to the first radio resource pool.

In one embodiment, the UE 450 corresponds to the UE in the disclosure.

In one embodiment, the gNB 410 corresponds to the base station in the disclosure.

In one embodiment, at least the former two of the receiver 456, the receiving processor 452 and the controller/processor 490 are used for receiving a first higher-layer signaling in the disclosure.

In one embodiment, the receiver 456 and the receiving processor 452 are used for monitoring a first-type physical layer signaling.

In one embodiment, at least the former two of the receiver 456, the receiving processor 452 and the controller/processor 490 are used for receiving second downlink information in the disclosure.

In one embodiment, at least the former two of the transmitter 416, the transmitting processor 415 and the controller/processor 440 are used for transmitting a first higher-layer signaling in the disclosure.

In one embodiment, the transmitter 416 and the transmitting processor 415 are used for transmitting a first-type physical layer signaling in the disclosure.

In one embodiment, at least the former two of the transmitter 416, the transmitting processor 415 and the controller/processor 440 are used for transmitting second downlink information in the disclosure.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the disclosure includes but not limited to mobile phones, tablet computers, notebooks, network cards, NB-IOT equipment, eMTC terminals, and other wireless communication equipment. The base station or system equipment in the disclosure includes but not limited to macro-cellular base stations, micro-cellular base stations, home base stations, relay base stations, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for multi-antenna transmission, comprising:
    receiving a Radio Resource Control (RRC) Reconfiguration signaling;
    monitoring a physical layer signaling in a first radio resource pool; and
    receiving a Physical Downlink Control Channel (PDCCH) transmission in a second radio resource pool;
    wherein the RRC Reconfiguration signaling is used, by the UE, for determining first information and second information, and the first information is used, by the UE, for multi-antenna related receiving in the first radio resource pool;
    wherein, prior to receiving the PDCCH transmission in the second radio resource pool, when the UE receives an indication of an antenna port group for the PDCCH in the second radio resource pool, the UE uses the indicated antenna port group for multi-antenna related receiving in the second radio resource pool, and when the UE does not receive such an indication, the UE uses the second information for multi-antenna related receiving in the second radio resource pool;
    wherein the second radio resource pool is related to the first radio resource pool;
    wherein the first information is used, by the UE, for determining a first antenna port group, the second information is used, by the UE, for determining a second antenna port group, the first antenna port group and the second antenna port group each comprising one or more antenna ports;
    wherein the RRC Reconfiguration signaling is further used for determining the first radio resource pool and the second radio resource pool.

2. The method according to claim 1, wherein the first radio resource pool and the second radio resource pool are each a control resource set.

3. The method according to claim 1, wherein an antenna port group used for transmitting the physical layer signaling is quasi co-located (QCL) with the first antenna port group, and in response to receiving the indication, an antenna-port group used for transmitting the PDCCH in the second radio resource pool is quasi-co-located with an antenna-port group selected based on the indication.

4. The method according to claim 1, wherein the first information, in combination with other physical layer or Medium Access Control (MAC) layer information, is used for determining the first antenna port group.

5. The method according to claim 1, wherein the physical layer signaling is a PDCCH; or, the physical layer signaling is Downlink Control Information (DCI) and used for determining a downlink scheduling assignment.

6. The method according to claim 1, wherein the physical layer signaling is detected on a first radio resource, the second radio resource pool is located behind the first radio resource in time domain, and the first radio resource is used for calculating the second radio resource pool; or the physical layer signaling is detected on a first radio resource, the second radio resource pool is located behind the first radio resource in time domain, and the first radio resource is used for calculating the second radio resource pool, the second radio resource pool is one or more consecutive subframes starting from at least one subframe behind the first radio resource.

7. The method according to claim 1, wherein, when the UE demodulates the PDCCH transmission in the second radio resource pool, the UE uses a PDCCH demodulation reference signal (DMRS) antenna port group that is quasi co-located with the second antenna port group when no such indication is received or with an antenna port group selected based on the indication when the indication is received.

8. A method in a base station for multi-antenna transmission, comprising:
transmitting a Radio Resource Control (RRC) Reconfiguration signaling;
transmitting a physical layer signaling in a first radio resource pool; and
transmitting a Physical Downlink Control Channel (PDCCH) transmission in a second radio resource pool;
wherein the RRC Reconfiguration signaling is used, by a receiving site, for determining first information and second information, and the first information is used, by the receiving site, for multi-antenna related receiving in the first radio resource pool;
wherein, prior to transmitting the PDCCH transmission in the second radio resource pool, the base station transmits an indication of an antenna port group for the PDCCH in the second radio resource pool, and responsive to the indication being detected at the receiving site, the receiving site uses the indicated antenna port group for multi-antenna related receiving in the second radio resource pool, otherwise, the receiving site uses the second information for multi-antenna related receiving in the second radio resource pool;
wherein the second radio resource pool is related to the first radio resource pool;
wherein the first information is used, by the receiving site, for determining a first antenna port group, the second information is used, by the receiving site, for determining a second antenna port group, the first antenna port group and the second antenna port group each comprising one or more antenna ports;
wherein the RRC Reconfiguration signaling is further used for determining the first radio resource pool and the second radio resource pool.

9. The method according to claim 8, wherein, when transmitting the PDCCH in the second radio resource pool, the base station uses a PDCCH demodulation reference signal (DMRS) antenna port group that is quasi co-located with the second antenna port group when no such indication is received at the receiving site or an antenna port group selected based on the indication when the indication is received at the receiving site.

10. A UE for multi-antenna transmission, comprising:
one or more receivers configured to:
receive a Radio Resource Control (RRC) Reconfiguration signaling; and
monitor a physical layer signaling in a first radio resource pool; and
receive a Physical Downlink Control Channel (PDCCH) transmission in a second radio resource pool;
wherein the RRC Reconfiguration signaling is used, by the UE, for determining first information and second information, and the first information is used, by the UE, for multi-antenna related receiving in the first radio resource pool;
wherein, prior to receiving the PDCCH transmission in the second radio resource pool, when the UE receives an indication of an antenna port group for the PDCCH in the second radio resource pool, the UE uses the indicated antenna port group for multi-antenna related receiving in the second radio resource pool, and when the UE does not receive such an indication, the UE uses the second information for multi-antenna related receiving in the second radio resource pool;
wherein the second radio resource pool is related to the first radio resource pool;
wherein the first information is used, by the UE, for determining a first antenna port group, the second information is used, by the UE, for determining a second antenna port group, the first antenna port group and the second antenna port group each comprising one or more antenna ports;
wherein the RRC Reconfiguration signaling is further used for determining the first radio resource pool and the second radio resource pool.

11. The UE according to claim 10, wherein the first radio resource pool and the second radio resource pool are each a control resource set.

12. The UE according to claim 10, wherein an antenna port group used for transmitting the physical layer signaling is quasi co-located (QCL) with the first antenna port group, and in response to detecting the indication, an antenna-port group used for transmitting the PDCCH in the second radio resource pool is quasi-co-located with an antenna-port group selected based on the indication.

13. The UE according to claim 10, wherein the first information, in combination with other physical layer or Medium Access Control (MAC) layer information, is used for determining the first antenna port group.

14. The UE according to claim 10, wherein the physical layer signaling is a PDCCH or the physical layer signaling is Downlink Control Information (DCI) and used for determining a downlink scheduling assignment.

15. The UE according to claim 10, wherein the physical layer signaling is detected on a first radio resource, the second radio resource pool is located behind the first radio resource in time domain, and the first radio resource is used for calculating the second radio resource pool; or the physical layer signaling is detected on a first radio resource, the second radio resource pool is located behind the first radio resource in time domain, and the first radio resource is used for calculating the second radio resource pool, the second radio resource pool is one or more consecutive subframes starting from at least one subframe behind the first radio resource.

16. The UE according to claim 10, wherein when the UE demodulates the PDCCH transmission in the second radio resource pool, the UE uses a PDCCH demodulation reference signal (DMRS) antenna port group that is quasi co-located with the second antenna port group when no such indication is received or with an antenna port group selected based on the indication when the indication is received.

17. A base station for multi-antenna transmission, comprising:
one or more transmitters configured to:
   transmit a Radio Resource Control (RRC) Reconfiguration signaling
   transmit a physical layer signaling in a first radio resource pool; and
   transmit a Physical Downlink Control Channel (PDCCH) transmission in a second radio resource pool;
wherein the RRC Reconfiguration signaling is used, by a receiving site, for determining first information and second information, and the first information is used, by the receiving site, for multi-antenna related receiving in the first radio resource pool;
wherein, prior to transmitting the PDCCH transmission in the second radio resource pool, the base station transmits an indication of an antenna port group for the PDCCH in the second radio resource pool, and responsive to the indication being detected at the receiving site, the receiving site uses the indicated antenna port group for multi-antenna related receiving in the second radio resource pool, otherwise, the receiving site uses the second information for multi-antenna related receiving in the second radio resource pool;
wherein the second radio resource pool is related to the first radio resource pool;
wherein the first information is used, by the receiving site, for determining a first antenna port group, the second information is used, by the receiving site, for determining a second antenna port group, the first antenna port group and the second antenna port group each comprising one or more antenna ports;
the RRC Reconfiguration signaling is further used for determining the first radio resource pool and the second radio resource pool.

18. The base station according to claim 17, when transmitting the PDCCH in the second radio resource pool, the base station uses a PDCCH demodulation reference signal (DMRS) antenna port group that is quasi co-located with the second antenna port group when no such indication is received at the receiving site or an antenna port group selected based on the indication when the indication is received at the receiving site.

19. The method according to claim 1, wherein the RRC Reconfiguration signaling is further used for determining the first radio resource pool and a second radio resource set, the first radio resource pool and the second radio resource set are orthogonal in time domain or frequency domain, and radio resources in the second radio resource pool are in the second radio resource set.

20. The UE according to claim 10, wherein the RRC Reconfiguration signaling is further used for determining the first radio resource pool and a second radio resource set, the first radio resource pool and the second radio resource set are orthogonal in time domain or frequency domain, and radio resources in the second radio resource pool are in the second radio resource set.

21. The method according to claim 19, wherein, when the UE does not receive the indication, the second information is used for multi-antenna related receiving in the second radio resource set, and when the UE receives the indication, the second information is used for multi-antenna related receiving in the second radio resource set other than the second radio resource pool.

22. The UE according to claim 20, when the UE does not receive the indication, the second information is used for multi-antenna related receiving in the second radio resource set, and when the UE receives the indication, the second information is used for multi-antenna related receiving in the second radio resource set other than the second radio resource pool.

* * * * *